(12) United States Patent
Li et al.

(10) Patent No.: US 10,277,354 B1
(45) Date of Patent: Apr. 30, 2019

(54) EFFICIENT MODE COUPLING USING LADDER FIBERS

(71) Applicants: Futurewei Technologies, Inc., Plano, TX (US); The University of Central Florida Research Foundation, Inc., Orlando, FL (US)

(72) Inventors: Guifang Li, Orlando, FL (US); Zhihong Li, San Jose, CA (US); Demetrios Christodoulides, Orlando, FL (US); Huiyuang Liu, Orlando, FL (US); He Wen, Orlando, FL (US); Mohammadamin Eftekhar, Orlando, FL (US); Bin Huang, Orlando, FL (US)

(73) Assignees: Futurewei Technologies, Inc., Plano, TX (US); University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 15/897,667

(22) Filed: Feb. 15, 2018

(51) Int. Cl.
*H04J 14/04* (2006.01)
*G02B 6/02* (2006.01)
*G02B 6/14* (2006.01)
*G02B 6/293* (2006.01)

(52) U.S. Cl.
CPC .......... *H04J 14/04* (2013.01); *G02B 6/02042* (2013.01); *G02B 6/02085* (2013.01); *G02B 6/14* (2013.01); *G02B 6/2938* (2013.01)

(58) Field of Classification Search
CPC . H04J 14/04; G02B 6/02042; G02B 6/02085; G02B 6/14; G02B 6/2938
USPC .......................................................... 398/44
See application file for complete search history.

(56) References Cited

U.S. PATENT DOCUMENTS

| | | | |
|---|---|---|---|
| 2005/0025416 A1* | 2/2005 | Hallemeier | G02B 6/14 385/28 |
| 2014/0140694 A1* | 5/2014 | Zhou | H04J 14/02 398/44 |
| 2014/0286648 A1* | 9/2014 | Buelow | G02B 6/2808 398/143 |
| 2016/0349448 A1* | 12/2016 | Koonen | G02B 6/0288 |
| 2017/0026095 A1* | 1/2017 | Ashrafi | H04B 7/0456 |
| 2018/0246275 A1* | 8/2018 | Saito | G02B 6/02042 |
| 2018/0372948 A1* | 12/2018 | Hayashi | G02B 6/02 |

OTHER PUBLICATIONS

Arik, et al. "MIMO DSP Complexity in Mode-Division Multiplexing," Th1D.pdf, Optical Society of America, 2016, 3 pages.
Fang, et al., "Low-DMD Few-mode Fiber with Distributed Long-period Grating," Optics Letters, vol. 40, No. 15, Sep. 1, 2015, pp. 3937-3940.

(Continued)

*Primary Examiner* — Dalzid E Singh
(74) *Attorney, Agent, or Firm* — Conley Rose, P.C.

(57) ABSTRACT

An optical fiber system including an optical fiber and an optical grating is provided. The optical fiber is configured to support M mode groups, where differences in effective refractive index between adjacent mode groups are substantially equal. The optical grating is optically coupled to the optical fiber, and has a period inversely proportional to the difference in effective refractive index between adjacent mode groups. The optical grating is configured to couple all adjacent mode groups in the optical fiber.

20 Claims, 5 Drawing Sheets

(56) References Cited

OTHER PUBLICATIONS

Sillard, et al., "Low-Differential-Mode-Group-Delay 9-LP-Mode Fiber," M2C.2.pdf, Optical Society of America, 2015, 3 pages.
Carrero, et al., "Using Advanced S2 Analysis to Measure Mode Coupling in a 2-LP-Mode Fiber," W4F.5.pdf, Optical Society of America, 2016, 3 pages.
Sevigny, et al., "Advanced $S2$ Imaging Spatial Mode Analysis: Furthering Modal Characterization," Proceedings of SPIE, SPIEDigitalLibrary.org/conference-proceedings-of-spie, 2016, 8 pages.
Savin, et al., "Tunable Mechanically Induced Long-period Fiber Gratings," Optics Letters, vol. 25, No. 10, May 15, 2000, pp. 710-712.
Giles, et al., "Fiber LPG Mode Converters and Mode Selection Technique for Multimode SDM," IEEE Photonics Technology Letters, vol. 24, No. 21, Nov. 1, 2012, pp. 1922-1925.
Sakamoto, et al., "Transmission over Large-core Few-mode Photonic Crystal Fiber Using Distance-independent Modal Dispersion Compensation Technique," Optical Society of America, 2011, vol. 19, No. 26, 8 pages.
Askarov, et al., "Long-Period Fiber Gratings for Mode Coupling in Mode-Division-Multiplexing Systems," Journal of Lightwave Technology, vol. 33, No. 19, Oct. 1, 2015, pp. 4032-4038.

\* cited by examiner

EFFICIENT MODE COUPLING USING LADDER FIBERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The disclosure relates generally to optical fiber systems, and, in particular, to an optical fiber or multi-core optical fiber system adapted for mode-division multiplex communication.

BACKGROUND

Optical signals may be conducted over fiber-optic links in point-to-point communication. A plurality of channels of information may be multiplexed in such optical signals using time-division multiplexing (TDM), wavelength-division multiplexing (WDM), or space-division multiplexing (SDM), including mode-division multiplexing (MDM).

SUMMARY

In an embodiment, the disclosure includes an optical fiber system comprising an optical fiber, configured to support M mode groups, where differences in effective refractive index between adjacent mode groups are substantially equal, and an optical grating optically coupled to the optical fiber, the optical grating having a period inversely proportional to the difference in effective refractive index between adjacent mode groups and configured to couple adjacent mode groups in the optical fiber. M is an integer value indicating the number of mode groups. Optionally, M is an integer equal to or greater than 3. Optionally, the optical grating is configured to couple all adjacent mode groups in the optical fiber.

Optionally, in any of the preceding aspects, another implementation of the aspect provides the optical grating comprises stressed regions formed within the optical fiber. Optionally, in any of the preceding aspects, another implementation of the aspect provides the optical fiber comprises an extended section configured to support the M mode groups with substantially equal effective refractive index differences between mode groups, and a grating section configured to support M+1 mode groups with substantially equal effective refractive index differences between mode groups, wherein the grating section comprises the optical grating. Optionally, in any of the preceding aspects, another implementation of the aspect provides the optical fiber comprises a graded index fiber having a parabolic index distribution. Optionally, in any of the preceding aspects, another implementation of the aspect provides the optical fiber comprises a core and a cladding, and wherein a core index distribution of the optical fiber satisfies $n_2 = n_1^2 - 2n_1^2 \Delta (r/a)^2$, where $\Delta = n_1^2 - n_2^2 / 2n_1^2$, $n_1$, and $n_2$ are the refractive indices of the core and the cladding, respectively, r is a radial position, a is a radius of the core, and n is the effective index at radial position r. Optionally, in any of the preceding aspects, another implementation of the aspect provides the optical fiber comprises a core and a cladding, and wherein the optical fiber comprises a graded index fiber having a pedestal at a core-cladding boundary. Optionally, in any of the preceding aspects, another implementation of the aspect provides the period of the optical grating is equal to $$\frac{2\pi}{\Delta \beta},$$

where $\Delta \beta$ is the difference in effective refractive index between adjacent mode groups.

In an embodiment, the disclosure includes an optical fiber system comprising a multi-core fiber optic system comprising a plurality of optical fibers, wherein each optical fiber comprises a core and a cladding, and wherein individual radii of the cores of the optical fibers are selected to support M mode groups, where differences in effective refractive index between adjacent mode groups are substantially equal, and an optical grating optically coupled to the multi-core fiber optic system, the optical grating having a period inversely proportional to the difference in effective refractive index between adjacent mode groups and configured to couple all adjacent mode groups in the optical fiber. M is an integer value indicating the number of mode groups. Optionally, M is an integer equal to or greater than 3. Optionally, the optical grating is configured to couple all adjacent mode groups in the optical fiber.

Optionally, in any of the preceding aspects, another implementation of the aspect provides the optical grating comprises stressed regions formed within each of the plurality of optical fibers. Optionally, in any of the preceding aspects, another implementation of the aspect provides a difference between an effective index of a highest order mode group and an effective index of the claddings of the plurality of optical fibers is greater than the differences in effective refractive index between adjacent mode groups. Optionally, in any of the preceding aspects, another implementation of the aspect provides the plurality of optical fibers are arranged in a rotationally symmetric pattern. Optionally, in any of the preceding aspects, another implementation of the aspect provides the plurality of optical fibers comprises seven optical fibers. Optionally, in any of the preceding aspects, another implementation of the aspect provides the seven optical fibers are arranged as a central optical fiber and six outer optical fibers, and wherein the multi-core fiber optic system satisfies $$\frac{d}{dz}\begin{bmatrix} A_1 \\ A_2 \\ A_3 \\ A_4 \\ A_5 \\ A_6 \\ A_7 \end{bmatrix} = \begin{bmatrix} \beta_1 & \kappa & \kappa & \kappa & \kappa & \kappa & \kappa \\ \kappa & \beta_2 & C & & & & C \\ \kappa & C & \beta_3 & C & & & \\ \kappa & & C & \beta_4 & C & & \\ \kappa & & & C & \beta_5 & C & \\ \kappa & & & & C & \beta_6 & C \\ \kappa & C & & & & C & \beta_7 \end{bmatrix} \begin{bmatrix} A_1 \\ A_2 \\ A_3 \\ A_4 \\ A_5 \\ A_6 \\ A_7 \end{bmatrix}$$

where $A_i$ is an amplitude of the light in each optical fiber core, $\beta_i$ is a propagation constant of each optical fiber core, $\kappa$ is a coupling coefficient between the core of the central optical fiber and the cores of the outer optical fibers, and C is a coupling coefficient between the cores of the outer optical fibers.

In an embodiment, the disclosure includes an optical communication system, comprising first and second mode-division multiplexing (MDM) transceivers, and an optical fiber system optically coupled to the first and second MDM transceivers and configured to convey optical signals between the first and second MDM transceivers, wherein the optical fiber system comprises an optical fiber, configured to support M mode groups, where differences in effective refractive index between adjacent mode groups are substantially equal, and an optical grating optically coupled to the optical fiber, the optical grating having a period inversely proportional to the difference in the effective refractive index between adjacent mode groups and configured to couple all adjacent mode groups in the optical fiber. M is an integer value indicating the number of mode groups. Optionally, M is an integer equal to or greater than 3. Optionally, the optical grating is configured to couple all adjacent mode groups in the optical fiber.

Optionally, in any of the preceding aspects, another implementation of the aspect provides the optical fiber system comprises a plurality of optical gratings located at a corresponding plurality of positions along the optical fiber. Optionally, in any of the preceding aspects, another implementation of the aspect provides the plurality of positions are at substantially equal intervals along the optical fiber. Optionally, in any of the preceding aspects, another implementation of the aspect provides the optical grating comprises stressed regions formed within the optical fiber. Optionally, in any of the preceding aspects, another implementation of the aspect provides the optical fiber comprises an extended section configured to support the M mode groups with substantially equal effective refractive index differences between mode groups, and a grating section configured to support M+1 mode groups with substantially equal effective refractive index differences between mode groups, wherein the grating section comprises the optical grating. Optionally, in any of the preceding aspects, another implementation of the aspect provides the optical fiber comprises a core and a cladding, and wherein the optical fiber comprises a graded index fiber having a parabolic index distribution and a pedestal at the core-cladding boundary. Optionally, in any of the preceding aspects, another implementation of the aspect provides the period of the optical grating is equal to $$\frac{2\pi}{\Delta\beta},$$

where $\Delta\beta$ is the difference in effective refractive index between adjacent mode groups.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
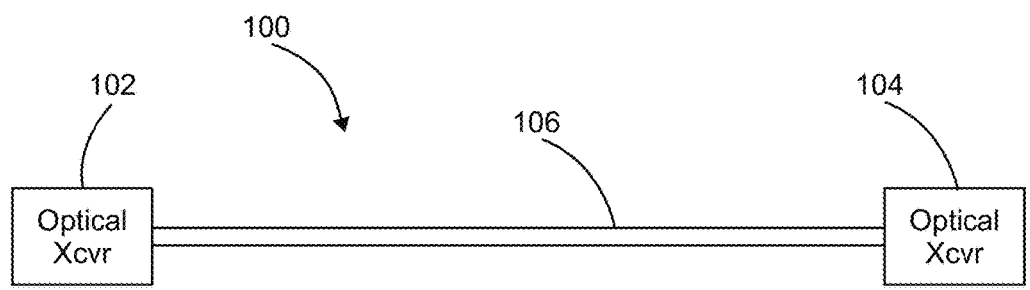
FIG. 1 is a schematic diagram of an embodiment of a first optical communication system according to the disclosure.

FIG. 1 is a schematic diagram of a first optical communication system 100. The first optical communication system 100 includes optical transceivers (Xcvrs) 102 and 104, which communicate using optical signals via a fiber optic link 106. In one example, optical transceiver 102 receives an electrical signal on an input, converts it to an optical signal, and injects the optical signal into the fiber optic link 106. The optical transceiver 104 receives the optical signal, processes it to remove noise and distortion resulting from its passage through the fiber optic link 106, and converts the processed signal to an output electrical signal. Through the use of multiplexing, multiple channels of signals may be transmitted simultaneously, or the optical transceivers 102 and 104 may both transmit and receive simultaneously.

As an optical signal (or light beam) propagates along a fiber optic link, interference effects occur when the beam reaches the core-cladding interface and is reflected. There are amplitude distributions of the light beam whose intensity profiles in cross section remain unchanged during propagation in a hypothetical lossless fiber. Such field distributions may be referred to as modes of the fiber.

Figure 2:
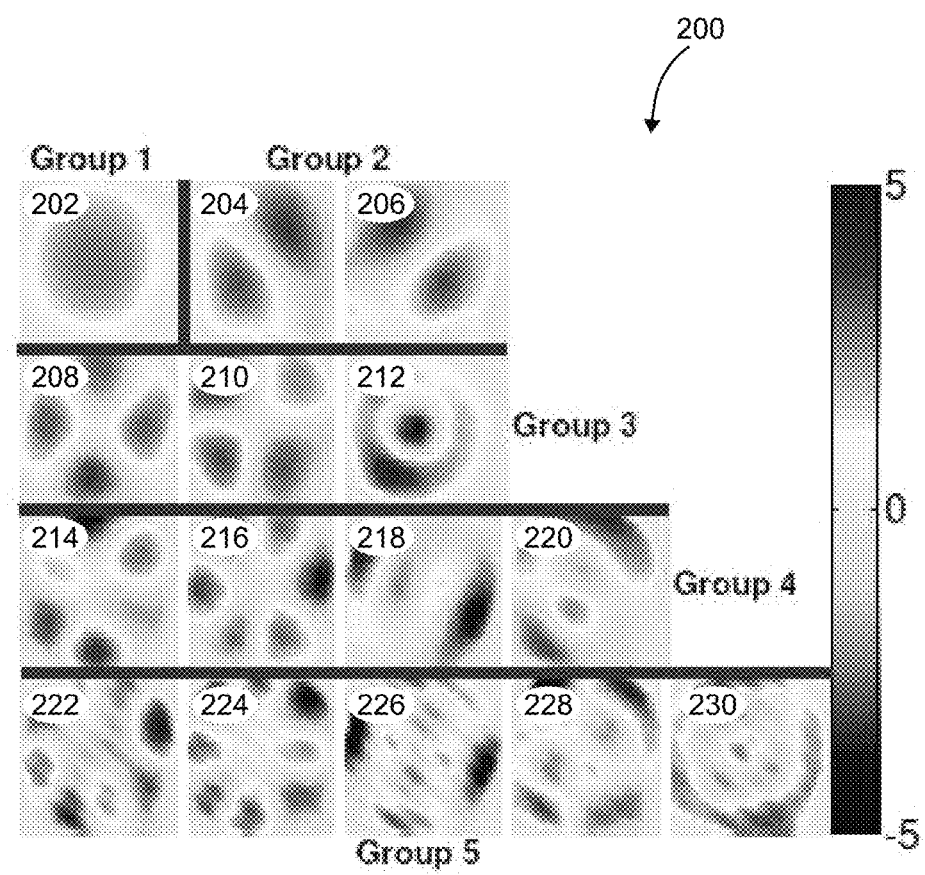
FIG. 2 presents a chart showing five groups of linearly polarized modes that may be observed in a fiber.

FIG. 2 presents a chart 200 showing five groups of linearly polarized (LP) modes that may be observed in a fiber. Group 1 includes a single LP mode: 202. Group 2 also includes a single LP mode, because profiles 204 and 206 are rotationally symmetric. Group 3 includes two LP modes: 208/210 and 212. Group 4 also includes two LP modes: 214/216 and 218/220. Finally, group 5 includes three LP modes: 222/224, 226/228, and 230.

Information carried in one mode group will "leak" into other mode groups leading to mode crosstalk, which may result from fiber imperfections or bending. Additionally, each mode group typically travels through the fiber at a different speed, due to modal dispersion. Mode crosstalk and modal dispersion may be detrimental to signal integrity. Multiple-input multiple-output (MIMO) digital signal processing (DSP) may be used to compensate for mode crosstalk and modal dispersion. However, the complexity of such MIMO DSP is typically proportional to a mode group delay spread among all the modes, which can be very large for long-haul MDM systems, increasing the cost and complexity of such systems.

Modal dispersion also causes signals sent simultaneously in different mode groups to arrive at the other end of the fiber at differing times, an effect referred to as modal group delay spread (GDS). GDS may be reduced (i.e., the difference between signal arrival times may be lessened) by inducing inter-mode coupling or crosstalk. For example, signals may be caused to swap modes or mode groups at certain points along the length of the fiber. In this way, the signals travel along parts of the fiber in a faster mode and along other parts of the fiber in a slower mode, reducing the difference in their arrival time at the other end of the fiber.

Figure 3:
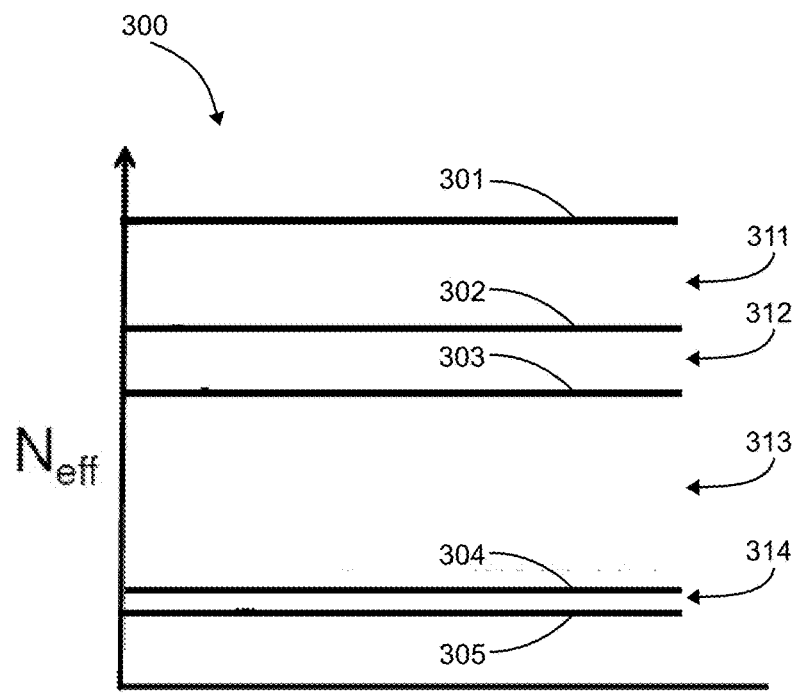
FIG. 3 presents a graph that illustrates a cause of a difference in propagation speed in an optical fiber between the mode groups shown in FIG. 2.

FIG. 3 presents a graph 300 that illustrates a cause of a difference in phase speed in an optical fiber between the mode groups shown in FIG. 2. The effective refractive indices ($N_{eff}$) 301 through 305 for five mode groups in a first type of fiber are displayed. A mode group may also be characterized by its propagation constant 13:

$$\beta = N_{eff} \frac{2\pi}{\lambda}, \quad (1)$$

where λ is the wavelength in a vacuum. The mode groups in graph 300 have unequal β spacings 311 through 314. FIG. 3 depicts a single-core or multi-core optical fiber wherein mode groups have unequally spaced effective refractive indices 301 through 305.

Weak mode coupling occurs randomly and parasitically in a fiber, but long period optical gratings (LPGs) may be used to couple signals from one mode (or mode group) into an adjacent mode (or mode group). Since mode coupling induced by LPGs is a coherent, phase-matched process, a different grating is required for each pair of modes (or mode groups). To couple modes i and j, a grating having period Λ is used, where $$\Lambda = \frac{2\pi}{\beta_i - \beta_j}. \quad (2)$$

To couple M modes, at least M−1 gratings are required. Thus, at least four gratings are required to couple the five modes shown in graph 300.

Figure 4:
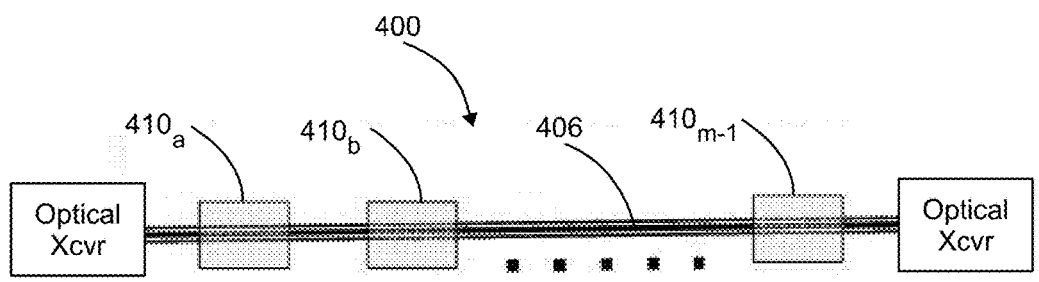
FIG. 4 is a schematic diagram of an embodiment of a second optical communication system according to the disclosure.

FIG. 4 is a schematic diagram of a second optical communication system 400. Optical fiber 406 has an unequal β spacing, similar to that described above with reference to FIG. 3. LPGs 410, through 410$_{m-1}$ are used with optical fiber 406 to decrease modal dispersion.

An LPG used for mode coupling may also couple the highest-order guided mode (or mode group) to a cladding mode in a phase-matched manner due to the high density of cladding modes. This may be seen as coupling guided modes to radiation modes. In addition to this intrinsic loss of signal strength, each LPG also has extrinsic signal loss due to imperfections in the grating. As seen above, as the number of modes multiplexed into a fiber increases, so does the number of LPGs required to couple the modes. A large number of LPGs adds complexity and cost to the process of fabricating a fiber for use with MDM, as well as causing a higher level of accumulated signal loss.

Disclosed herein is an optical fiber or multi-core optical fiber system wherein mode groups have equally spaced effective refractive indices. A single LPG is used to couple signals from one mode (or mode group) into an adjacent mode (or mode group) to decrease modal dispersion. The effective refractive index of the highest order signal-carrying mode group is sufficiently far from the effective refractive index of the fiber optic cladding to reduce the coupling of signal into a cladding mode.

Figure 5:
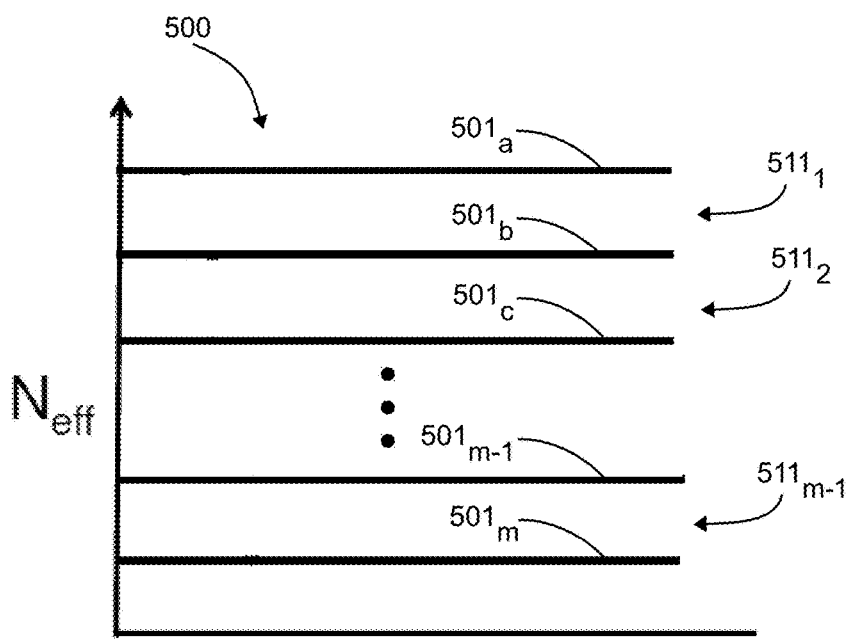
FIG. 5 depicts an optical fiber wherein mode groups have equally spaced effective refractive indices.

FIG. 5 depicts an optical fiber wherein mode groups have equally spaced effective refractive indices. Graph 500 shows $N_{eff}$ values 501$_a$ through 501$_m$ for M mode groups. The β spacings 511$_1$ through 511$_{m-1}$ are of substantially equal sizes, that is, they are within 10% of each other.

Figure 6:
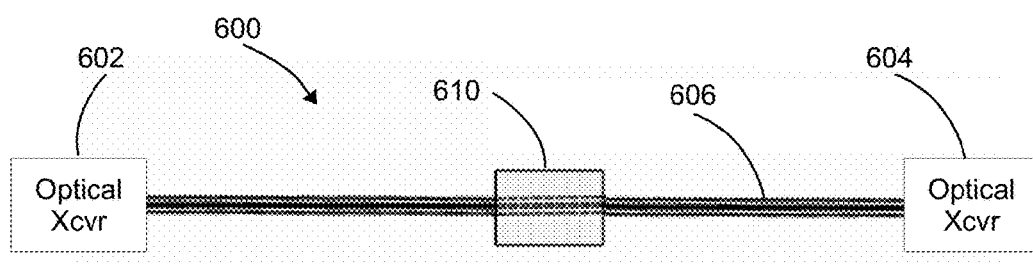
FIG. 6 is a schematic diagram of an embodiment of an optical communication system according to the disclosure.

FIG. 6 is a schematic diagram of an optical communication system 600 according to the disclosure. The optical communication system 600 comprises optical transceivers (Xcvrs) 602 and 604 and an optical fiber system 606. The optical fiber system 606 carries optical signals between the optical transceivers 602 and 604. The optical fiber system 606 has equal β spacing, similar to that described above with reference to FIG. 5. A single LPG 610 may be used with optical fiber system 606 to decrease modal dispersion by coupling all adjacent modes or mode groups to each other. Such an LPG provides mode coupling that is effective among all mode groups and over a broad wavelength range, as well as reducing insertion loss and mode-dependent loss.

The LPG 610 has a period Λ calculated using Equation (2) based on the common β difference between all mode groups in the optical fiber 606, i.e., $$\Lambda = \frac{2\pi}{\Delta\beta},$$

where Δβ is the common β difference between mode groups. Where the differences in effective refractive indices between adjacent mode groups are not exactly equal, Δβ may be the mean β difference between mode groups.

In embodiments where the optical transceivers 602 and 604 are separated by a large distance (also referred to as a long-haul system), additional LPGs 610 may be included at multiple locations along the optical fiber system 606, for example every 10 kilometers. In some such embodiments, additional LPGs 610 may be included at substantially equal intervals, that is, where the distance between LPGs 610 are within 20% of each other. One benefit of using additional LPGs is reducing the GDS.

Graded-index (GRIN) few-mode fibers (FMFs) with a parabolic index distribution may be used to produce optical fibers having mode groups with substantially equally spaced effective indices, as described with reference to FIG. 5. For a parabolic GRIN fiber with a core index distribution satisfying the equation $$n^2 = n_1^2 - 2n_1^2 \Delta (r/a)^2 \quad (3)$$

(where $\Delta = n_1^2 - n_2^2 / 2n_1^2$, $n_1$ and $n_2$ are the refractive indices of the core and cladding, respectively, r is the radial position, a is the core radius, and n is the effective index at radial position r), the amplitude of the electric field of a guided mode in the core $$E = E(x,y) \exp(-j\beta z) \quad (4)$$

(where x, y, and z are axes of linear polarization, $\beta$ is the propagation constant of the guided mode, and j is the imaginary unit) satisfies the equation:

$$-\left(\frac{\partial^2}{\partial_x^2} + \frac{\partial^2}{\partial_y^2}\right) E + \frac{2k_1^2 \Delta}{a^2}(x^2 + y^2) E = (k_1^2 - \beta^2) E \quad (5)$$

(where $k_0$ is the free-space wavenumber, and $k_1 = k_0 n_1$). This is a differential equation for isotropic two-dimensional harmonic oscillators with known Hermite-Gaussian mode solutions. This eigenvalue problem, assuming that the fields completely vanish in the cladding, admits standard solutions given by $$k_1^2 - \beta^2 = 2\sqrt{\frac{2k_1^2 \Delta}{a^2}} (m_x + m_y + 1) \quad (6)$$

(where $m_x = 0, 1, 2 \ldots$ and $m_y = 0, 1, 2 \ldots$ are non-negative integers representing the orders of the modes).

For such a GRIN fiber, the propagation constants $$\beta = \sqrt{k_1^2 - k_1 \frac{2\sqrt{2\Delta}}{a}(m_x + m_y + 1)} \approx k_1 - \frac{\sqrt{2\Delta}}{a}(m_x + m_y + 1) \quad (7)$$

of successive mode groups are substantially equally spaced. The design of FMFs with equally spaced effective indices is scalable to a larger number of mode groups. As the number of mode groups grows in a parabolic GRIN fiber, the condition for equally-spaced effective indices becomes better satisfied since most of the modes are well confined.

Figure 7:
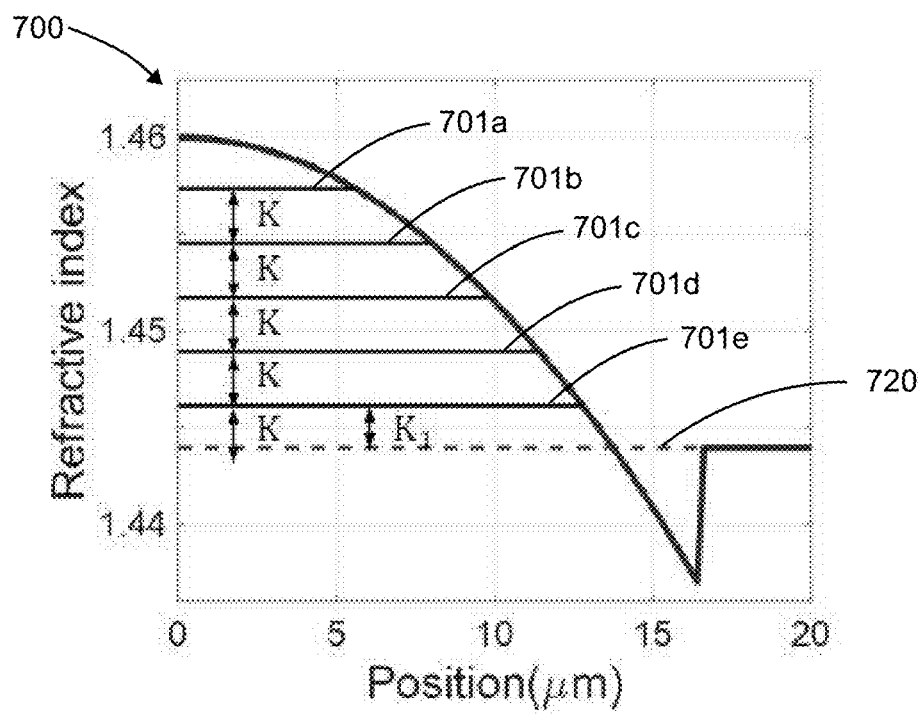
FIG. 7 presents a graph of refractive index versus distance from the fiber's core for a graded-index fiber having a low-index trench.

FIG. 7 presents a graph 700 of refractive index versus distance from the fiber's core for a GRIN fiber having a low-index trench. In one embodiment, the fiber represented in FIG. 7 has $n_1 = 1.46$, $\Delta = 0.0109$, $a = 16.4$ micrometer (μm), and $n_{trench} = 1.437$, resulting in five mode groups 701a through 701e (9 LP modes) at 1550 nanometers (nm) having substantially equal effective index differences K that range from $2.66 \times 10^{-3}$ to $2.69 \times 10^{-3}$ between successive mode groups. In such a fiber, all adjacent mode groups may be coupled using a single LPG having a period based on the effective index difference K.

However, because the difference $K_1$ between the effective index of the lowest order mode group 701e and the effective index 720 of the cladding is close to K, an LPG designed to couple the mode groups 701a through 701e, while reducing modal dispersion, will also operate to couple the mode group 701e to the cladding, resulting in some unwanted signal loss (albeit reduced by the presence of the trench).

Figure 8:
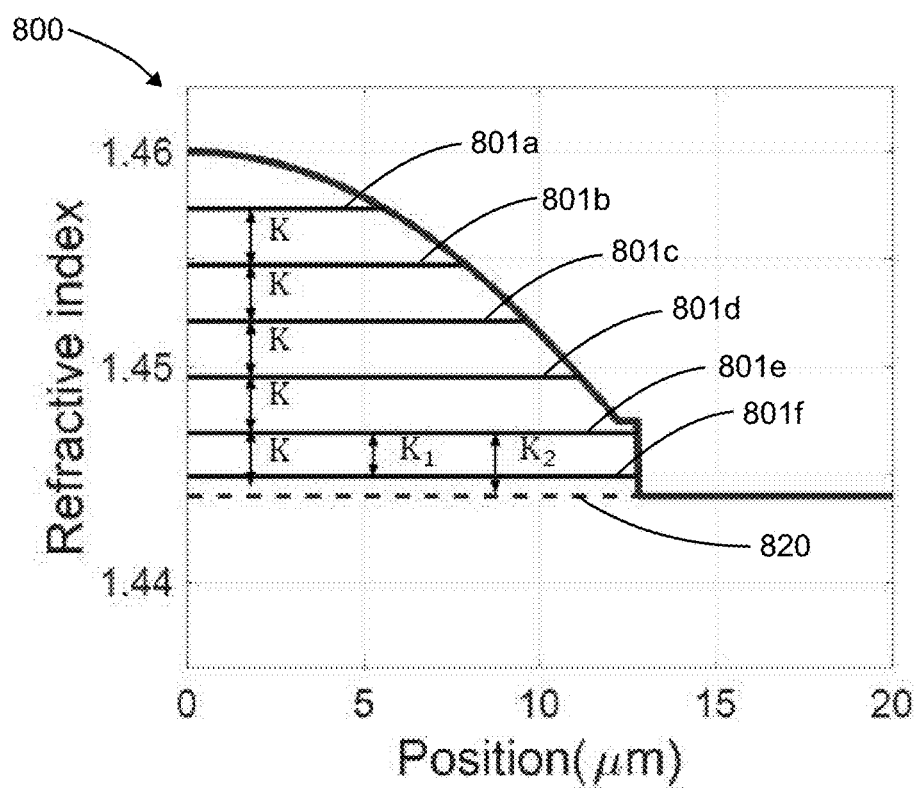
FIG. 8 presents a graph of refractive index versus distance from the fiber's core for a graded-index fiber having a pedestal at the core-cladding boundary.

FIG. 8 presents a graph 800 of refractive index versus distance from the fiber's core for a GRIN fiber having a pedestal at the core-cladding boundary. The GRIN fiber represented in FIG. 8 supports six mode groups with effective indices 801a through 801f and has a cladding with effective index 820. The index profile is adjusted to have substantially equal spacings K between the effective indices of the first five mode groups, and an effective index difference $K_1$ between the fifth and sixth mode groups smaller than the average index difference K between the first five mode groups. Because of the pedestal and the sixth mode group, the difference $K_2$ between the fifth mode group and the cladding is greater than the difference K between the first five mode groups. In one embodiment, the fiber represented in FIG. 8 has the same core and cladding indices as the fiber represented in FIG. 7, but a radius value of 12.75 μm and $a = 1.986$. In this embodiment, the pedestal has a width and height of 0.55 μm and 0.0035, respectively.

Because the difference $K_2$ between the effective index of the fifth mode group 801e and the effective index 820 of the cladding is greater than K and the difference $K_1$ between 801e and 801f is less than K, an LPG designed to couple the mode groups 801a through 801e will be effective to couple all adjacent equally-spaced mode groups, but will not be effective to couple the mode group 801e to either the cladding or the sixth mode group 801f. As such, it will be inefficient for the first five mode groups to couple into either the highest-order mode group or the cladding modes, resulting in reduced intrinsic signal loss as well as reduced modal dispersion.

Figure 9:
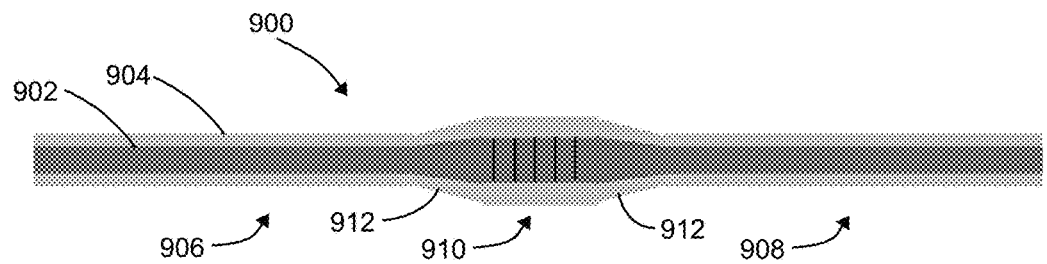
FIG. 9 presents a schematic view of an optical fiber system according to the disclosure, having a long period optical grating.

FIG. 9 presents a schematic view of an optical fiber system 900 according to the disclosure, having an LPG. The optical fiber system 900 includes a core 902 surrounded by cladding 904. The optical fiber system 900 includes extended sections 906 and 908, separated by a grating section 910.

In one embodiment, the extended sections 906 and 908 are designed for five mode groups (one embodiment of which is described with reference to FIG. 7) and the grating section 910 is designed for six mode groups (one embodiment of which is described with reference to FIG. 8). In this embodiment, the extended sections 906 and 908 have a core radius of 10.5 μm and the grating section 910 has a radius of 12.2 μm. In this embodiment, the extended sections 906 and 908 are coupled to the grating section 910 by adiabatic taper sections 912. In another embodiment, the extended sections 906 and 908 and the grating section 910 are all designed for five mode groups and have the same radius.

The grating section 910 includes an LPG created by producing multiple stressed regions within the optical fiber, where the stressed regions are separated by the desired period of the LPG. In some embodiments, such stressed regions may be produced in the fiber of the grating section 910 by physically clamping the fiber with a plate having a grating of the desired period. In other embodiments, the stressed regions may be produced within the fiber of the grating section 910 by using the arc method to disrupt the optical properties of the fiber in regions separated by the desired period. Other techniques for producing an LPG in an optical fiber will be known to a person of skill in the art. A relative angle between the fiber and the LPG may also be adjusted to change the effective period of the LPG.

Figure 10:
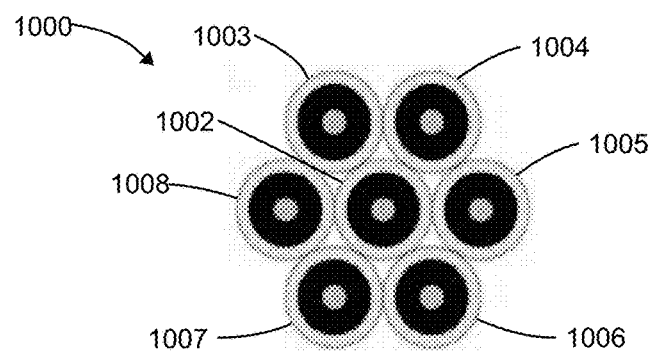
FIG. 10 presents a schematic, cross-sectional view of a fiber optic system according to the disclosure, having equally spaced effective refractive indices.

FIG. 10 presents a schematic, cross-sectional view of a multi-core fiber optic system 1000 according to the disclosure, having equally spaced effective refractive indices. The multi-core fiber optic system 1000 includes individual optical fibers 1002 through 1008. By selecting an appropriate radius for each of the optical fibers 1002 through 1008

(based on the fibers' core-cladding index combinations), an equal spacing between effective indices of mode groups may be produced.

Figure 11:
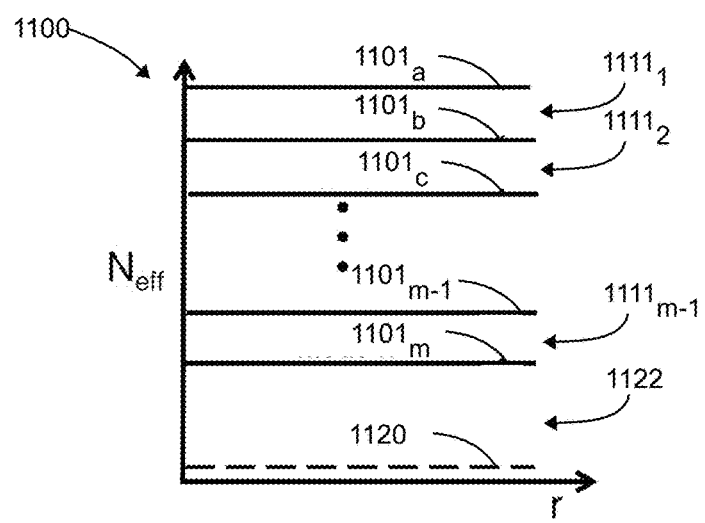
FIG. 11 presents a graph of refractive index versus distance from the core of a central fiber for the multi-core fiber optic system of FIG. 10.

FIG. 11 presents a graph 1100 of refractive index versus distance from the core of the central optical fiber 1002 for the multi-core fiber optic system 1000 described with reference to FIG. 10. The multi-core fiber optic system 1000 supports M mode groups with effective indices $1101_a$ through $1101_m$ and the individual fibers 1002 through 1008 have claddings with effective index 1120. The radii of the optical fibers 1002 through 1008 are selected (as described in more detail below) to result in substantially equal spacings $1111_1$ through $1111_{m-1}$ between the effective indices $1101_a$ through $1101_m$ of the M mode groups. Furthermore, the difference 1122 between the effective index $1101_m$ of the highest order mode group and the effective index 1120 of the claddings is much greater than the spacings $1111_1$ through $1111_{m-1}$.

Because the difference 1122 is greater than the spacings $1111_1$ through $1111_{m-1}$, an LPG designed to couple all the adjacent, equally-spaced mode groups $1101_a$ through $1101_m$ will not be effective to couple the mode group $1101_m$ to the cladding. As such, it will be inefficient for signals in the M mode groups to couple into the cladding modes, resulting in reduced intrinsic signal loss as well as reduced modal dispersion.

The same techniques described with reference to FIG. 9 for producing an LPG in a single fiber optic embodiment may also be used in the multi-core fiber optic system 1000 of FIG. 10.

The following example illustrates one technique for selecting an appropriate radius for each of the fibers 1002 through 1008 to produce an equal spacing between effective indices of mode groups. While this embodiment provides a multi-core system, it will be understood that in other embodiments, multi-core systems with more or fewer fibers may be used. Similarly, while the fibers in this embodiment are arranged in a rotationally symmetric pattern, the fibers in other embodiments may be arranged with other symmetries or in an asymmetric pattern.

In the embodiment described with reference to FIG. 10, the core index for each fiber is 1.4489 and the cladding index is 1.4446 and the core-to-core distance is 12 μm. For such a multi-core system with seven fibers, the system satisfies the equation:

$$\frac{d}{dz}\begin{bmatrix} A_1 \\ A_2 \\ A_3 \\ A_4 \\ A_5 \\ A_6 \\ A_7 \end{bmatrix} = \begin{bmatrix} \beta_1 & \kappa & \kappa & \kappa & \kappa & \kappa & \kappa \\ \kappa & \beta_2 & C & & & & C \\ \kappa & C & \beta_3 & C & & & \\ \kappa & & C & \beta_4 & C & & \\ \kappa & & & C & \beta_5 & C & \\ \kappa & & & & C & \beta_6 & C \\ \kappa & C & & & & C & \beta_7 \end{bmatrix} \begin{bmatrix} A_1 \\ A_2 \\ A_3 \\ A_4 \\ A_5 \\ A_6 \\ A_7 \end{bmatrix}, \quad (8)$$

where $A_i$ is the amplitude of the light in each core, $\beta_i$ is the propagation constant of each core, κ is the coupling coefficient between the center core and the outer cores, and C is the coupling coefficient between the outer cores. $\beta_i$ is related to the radius of the fiber, based on its core-cladding index combination. Both κ and C are weakly dependent on the core radii.

The propagation constants $\beta_i$ are the eigenvalues of the coupling matrix. By constraining the propagation constants $\beta_i$ to an arithmetic sequence, seven possible values of $\beta_i$ may be determined. These values may be adjusted by small amounts to account for variations in κ and C. From the seven values of $\beta_i$, corresponding radii of the seven corresponding fibers may be determined. Where other groups of seven values of $\beta_i$ satisfy the constraints, a group of seven values corresponding to fibers of a desirable cost, complexity, and/or ease of fabrication may be chosen.

In one embodiment, the core index for each fiber is 1.4489 and the cladding index is 1.4446 and the core-to-core distance is 12 μm. One set of optical fiber radii that produce equally spaced effective refractive indices for this embodiment are:

$r_1$=3.548 μm,
$r_2$=4.038 μm,
$r_3$=3.973 μm,
$r_4$=4.135 μm,
$r_5$=4.800 μm,
$r_6$=3.364 μm, and
$r_7$=4.422 μm.

The fiber optic systems described with reference to FIGS. 5, 7, 8, and 11 have effective indexes of guided mode groups that form an arithmetic sequence, visually similar to the steps of a ladder. As a result, such fiber optic systems may be referred to as ladder fibers.

As discussed above, MIMO DSP is used to perform equalization on received signals in MDM, to compensate for mode crosstalk and modal dispersion. The complexity of such MIMO equalization scales proportionally with transmission distance when modes couple weakly within the transmission fiber. However, when strong mode coupling is introduced, as in embodiments described above using ladder fibers and a single LPG, the MIMO equalization complexity scales with the square root of the transmission distance.

An optical fiber system includes an optical fiber means, configured to support M mode groups, where differences in effective refractive index between adjacent mode groups are substantially equal, and an optical grating means optically coupled to the optical fiber means, the optical grating means having a period inversely proportional to the difference in effective refractive index between adjacent mode groups and configured to couple all adjacent mode groups in the optical fiber means.

An optical fiber system includes a multi-core fiber optic means comprising a plurality of optical fiber means, wherein each optical fiber means comprises a core and a cladding, and wherein individual radii of the cores of the optical fiber means are selected to support M mode groups, where differences in effective refractive index between adjacent mode groups are substantially equal, and an optical grating means optically coupled to the multi-core fiber optic means, the optical grating means having a period inversely proportional to the difference in effective refractive index between adjacent mode groups and configured to couple all adjacent mode groups in the optical fiber means.

An optical communication system includes first and second mode-division multiplexing (MDM) transceiver means, and an optical fiber system optically coupled to the first and second MDM transceiver means and configured to convey optical signals between the first and second MDM transceiver means, wherein the optical fiber system comprises an optical fiber means, configured to support M mode groups, where differences in effective refractive index between adjacent mode groups are substantially equal, and an optical grating means optically coupled to the optical fiber means, the optical grating means having a period inversely proportional to the difference in the effective refractive index between adjacent mode groups and configured to couple all adjacent mode groups in the optical fiber means.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical fiber system, comprising:
an optical fiber, configured to support M mode groups, where differences in effective refractive index between adjacent mode groups are substantially equal, and where M is an integer equal to or greater than 3; and
an optical grating optically coupled to the optical fiber, the optical grating having a period inversely proportional to the difference in effective refractive index between adjacent mode groups and configured to couple adjacent mode groups in the optical fiber.

2. The optical fiber system of claim 1, wherein the optical grating comprises stressed regions formed within the optical fiber.

3. The optical fiber system of claim 1, wherein the optical fiber comprises:
an extended section configured to support the M mode groups with substantially equal effective refractive index differences between mode groups; and
a grating section configured to support M+1 mode groups with substantially equal effective refractive index differences between mode groups, wherein the grating section comprises the optical grating.

4. The optical fiber system of claim 1, wherein the optical fiber comprises a graded index fiber having a parabolic index distribution.

5. The optical fiber system of claim 4, wherein the optical fiber comprises a core and a cladding, and wherein a core index distribution n of the optical fiber satisfies $$n^2 = n_1^2 - 2n_1^2 \Delta (r/a)^2,$$

where $\Delta = n_1^2 - n_2^2 / 2n_1^2$, $n_1$, and $n_2$ are refractive indices of the core and the cladding, respectively, r is a radial position, a is a radius of the core, and n is an effective index at the radial position r.

6. The optical fiber system of claim 4, wherein the optical fiber comprises a core and a cladding, and wherein the optical fiber comprises the graded index fiber having a pedestal at a core-cladding boundary.

7. The optical fiber system of claim 1, wherein the period of the optical grating is equal to $$\frac{2\pi}{\Delta\beta},$$

where $\Delta\beta$ is the difference in effective refractive index between adjacent mode groups.

8. An optical fiber system, comprising:
a multi-core fiber optic system comprising a plurality of optical fibers, wherein each optical fiber comprises a core and a cladding, and wherein radii of each of the cores of the optical fibers are selected to support M mode groups, where differences in effective refractive index between adjacent mode groups are substantially equal, and where M is an integer value equal to or greater than 3; and
an optical grating optically coupled to the multi-core fiber optic system, the optical grating having a period inversely proportional to the difference in effective refractive index between adjacent mode groups and configured to couple adjacent mode groups in the optical fiber.

9. The optical fiber system of claim 8, wherein the optical grating comprises stressed regions formed within each of the plurality of optical fibers.

10. The optical fiber system of claim 8, wherein a difference between an effective index of a highest order mode group and an effective index of the claddings of the plurality of optical fibers is greater than the differences in effective refractive index between adjacent mode groups.

11. The optical fiber system of claim 8, wherein the plurality of optical fibers are arranged in a rotationally symmetric pattern.

12. The optical fiber system of claim 11, wherein the plurality of optical fibers comprises seven optical fibers.

13. The optical fiber system of claim 12, wherein the seven optical fibers are arranged as a central optical fiber and six outer optical fibers, and wherein the multi-core fiber optic system satisfies $$\frac{d}{dz}\begin{bmatrix} A_1 \\ A_2 \\ A_3 \\ A_4 \\ A_5 \\ A_6 \\ A_7 \end{bmatrix} = \begin{bmatrix} \beta_1 & \kappa & \kappa & \kappa & \kappa & \kappa & \kappa \\ \kappa & \beta_2 & C & & & & C \\ \kappa & C & \beta_3 & C & & & \\ \kappa & & C & \beta_4 & C & & \\ \kappa & & & C & \beta_5 & C & \\ \kappa & & & & C & \beta_6 & C \\ \kappa & C & & & & C & \beta_7 \end{bmatrix}\begin{bmatrix} A_1 \\ A_2 \\ A_3 \\ A_4 \\ A_5 \\ A_6 \\ A_7 \end{bmatrix},$$

where $A_i$ is an amplitude of light in each optical fiber core, $\beta_i$ is a propagation constant of each optical fiber core, $\kappa$ is a coupling coefficient between the core of the central optical fiber and the cores of the outer optical fibers, and C is a coupling coefficient between the cores of the outer optical fibers.

14. An optical communication system, comprising:
first and second mode-division multiplexing (MDM) transceivers; and
an optical fiber system optically coupled to the first and second MDM transceivers and configured to convey optical signals between the first and second MDM transceivers, wherein the optical fiber system comprises:
an optical fiber, configured to support M mode groups, where differences in effective refractive index between adjacent mode groups are substantially equal, and where M is an integer value equal to or greater than 3; and an optical grating optically coupled to the optical fiber, the optical grating having a period inversely proportional to the difference in the effective refractive index between adjacent mode groups and configured to couple adjacent mode groups in the optical fiber.

15. The optical communication system of claim 14, wherein the optical fiber system comprises a plurality of optical gratings located at a corresponding plurality of positions along the optical fiber.

16. The optical communication system of claim 14, wherein the plurality of positions are at substantially equal intervals along the optical fiber.

17. The optical communication system of claim 14, wherein the optical grating comprises stressed regions formed within the optical fiber.

18. The optical communication system of claim 14, wherein the optical fiber comprises:

an extended section configured to support the M mode groups with substantially equal effective refractive index differences between mode groups; and a grating section configured to support M+1 mode groups with substantially equal effective refractive index differences between mode groups, wherein the grating section comprises the optical grating.

19. The optical communication system of claim 14, wherein the optical fiber comprises a core and a cladding, and wherein the optical fiber comprises a graded index fiber having a parabolic index distribution and a pedestal at a core-cladding boundary.

20. The optical communication system of claim 14, wherein the period of the optical grating is equal to $$\frac{2\pi}{\Delta\beta},$$

where $\Delta\beta$ is the difference in effective refractive index between adjacent mode groups.

* * * * *